UNITED STATES PATENT OFFICE.

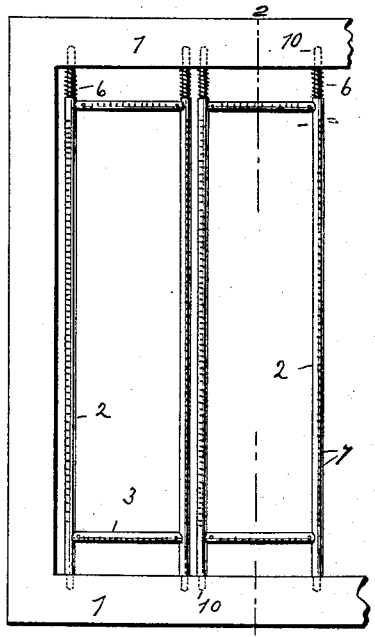

ALFRED HOFMANN, OF UNION HILL, NEW JERSEY.

EMBROIDERY-FRAME.

1,171,612.

Specification of Letters Patent.

Patented Feb. 15, 1916.

Application filed August 28, 1915. Serial No. 47,735.

*To all whom it may concern:*

Be it known that I, ALFRED HOFMANN, a citizen of the United States, and a resident of Union Hill, in the county of Hudson and State of New Jersey, have invented certain new and useful Improvements in Embroidery-Frames, of which the following is a specification.

This invention relates to an embroidery frame of novel construction and more particularly adapted to stretch knitted and textile articles such as stockings, socks, underwear, waist fronts, etc., and present the same to the needles of a shuttle embroidery machine.

In the accompanying drawing: Figure 1 is a face view of part of an embroidery frame embodying my invention; Fig. 2 an enlarged section on line 2—2 Fig. 1; Fig. 3 a front view partly in section of one of the holders; Fig. 4 a cross section thereof with the pin attaching means omitted on line 4—4 Fig. 5; Fig. 5 a longitudinal section on line 5—5, Fig. 4, and Fig. 6 a cross section on line 6—6 Fig. 5.

The device comprises essentially, a rectangular frame or casing 1, composed of hollow metal longitudinal and transverse bars, and adapted to be fitted to a shuttle embroidery machine the bars being of circular or rounded form in cross section.

Within frame 1, are removably secured a plurality of holders upon which the fabric to be embroidered is adapted to be spanned or stretched. Each holder is composed of a pair of longitudinal tubes or bars 2, and a pair of transverse tubes or bars 3 which are set back from the ends of tubes 2. The tubes are connected with each other by pins or plugs 4, 5 that protrude from the ends of tubes 2, and are screwed to cores 5ª fitted within tubes 3. Of these, the pins 4, at one end of the holder are longer than the pins 5 at the other end, and are encompassed by spiral springs 6.

The face of the holder constructed as described, is furnished with a plurality of teeth or pin points 7 adapted to engage the fabric to be stretched. These teeth are received within surface grooves 8, of tubes 2 and 3, which grooves are cut through the top arch of the tubes and extend in a plane which is parallel to a plane projected along the base of the holder, so that with a horizontally disposed holder, the grooves are likewise horizontal. The teeth 7 fitted into these grooves therefore, also extend in substantial parallelism with the base of the holder, and they are so positioned, that their heels or blunt ends are directed inwardly, while their pointed ends are directed outwardly. The length of the teeth should however be such, that their points do not project laterally beyond the outer edges of the rods, but are set inwardly from the lines of tangents that extend from the rods at right angles to the teeth, so that as the hand is passed along the holder, it is not liable to become cut or scratched. After the teeth have been seated within their grooves (Fig. 4) the holder is tinned or nickeled, whereby the grooves are filled out as at 9 (Fig. 6) and the teeth are securely held in place.

In use the articles to be embroidered are spanned over the several holders, and the latter are then fitted into frame 1, by projecting their pins 4 into corresponding apertures 10 of one of the longitudinal bars of the frame, (under temporary compression of springs 6), and then projecting pins 5 into apertures of the other bar.

The holders should be so spaced within the frame that their position corresponds to the "repeat" of the embroidery machine, so that each of the articles mounted on the holders will be embroidered by one of the needles.

It will be seen that the embroidery frame constructed as described, can be readily assembled, that the goods may be securely stretched thereon, without danger of mutilation, and that the frame is well adapted to make quantitative production readily feasible.

I claim:

1. An embroidery frame comprising a rectangular casing having transverse bars and apertured longitudinal bars, and a plurality of holders, having toothed transverse bars and toothed longitudinal bars, that project beyond the transverse bars, the ends of said longitudinal bars being adapted to be received by the apertured casing-bars, and springs mounted on the longitudinal holder-bars, beyond one of said transverse bars.

2. In an embroidery machine, a holder composed of rods which are of rounded shape in cross section, said rods being provided with a plurality of grooves extending through the arches thereof, and teeth fitted into said grooves, the points of said teeth being set back from the lines of tangents to the rods that are projected at right angles to the teeth.

ALFRED HOFMANN.

Copies of this patent may be obtained for five cents each, by addressing the "Commissioner of Patents, Washington, D. C."